(12) United States Patent
Webb et al.

(10) Patent No.: US 8,870,078 B2
(45) Date of Patent: Oct. 28, 2014

(54) HAND TOOL HAVING AN ELECTRONIC IDENTIFICATION DEVICE

(75) Inventors: David A. Webb, Cheraw, SC (US); Christopher J. Ruf, Marietta, GA (US); William Gatling, Acworth, GA (US)

(73) Assignee: Stanley Black & Decker, Inc., New Britain, CT (US)

( * ) Notice: Subject to any disclaimer, the term of this patent is extended or adjusted under 35 U.S.C. 154(b) by 123 days.

(21) Appl. No.: 13/368,761

(22) Filed: Feb. 8, 2012

(65) Prior Publication Data

US 2013/0200159 A1 Aug. 8, 2013

(51) Int. Cl.
*G06K 19/06* (2006.01)

(52) U.S. Cl.
USPC .......................................... 235/492; 235/375

(58) Field of Classification Search
CPC ................... A63F 2250/485; A63F 2009/2489
USPC .......................................... 235/492, 385, 375
See application file for complete search history.

(56) References Cited

U.S. PATENT DOCUMENTS

| | | | |
|---|---|---|---|
| 353,756 A | 12/1886 | Parkhurst | |
| 1,984,839 A | 12/1934 | Murray | |
| 3,251,150 A | 5/1966 | Sedgwick | |
| 4,588,339 A | 5/1986 | Bilz et al. | |
| 4,720,907 A | 1/1988 | Rapp | |
| 5,029,485 A | 7/1991 | Marr | |
| 5,101,695 A | 4/1992 | Johnson | |
| D353,756 S | 12/1994 | Graves | |
| D472,778 S | 4/2003 | Halstead | |
| 6,682,156 B2 | 1/2004 | Herrington | |
| 6,827,275 B2 | 12/2004 | Allen | |
| 6,840,451 B2 | 1/2005 | Allen | |
| 6,989,749 B2 | 1/2006 | Mohr | |
| 7,240,845 B2 | 7/2007 | Komine et al. | |
| 7,253,736 B2 | 8/2007 | Tethrake et al. | |
| 7,256,699 B2 | 8/2007 | Tethrake et al. | |
| 7,315,248 B2 | 1/2008 | Egbert | |
| 7,333,016 B2 | 2/2008 | Ancel | |
| 7,336,181 B2 | 2/2008 | Nowak et al. | |
| 7,339,477 B2 | 3/2008 | Puzio et al. | |
| 7,391,326 B2 | 6/2008 | Puzio et al. | |
| 7,431,682 B2 | 10/2008 | Zeiler et al. | |
| 7,483,766 B1 | 1/2009 | Frankel | |
| 7,500,917 B2 * | 3/2009 | Barney et al. | 463/37 |
| 7,557,709 B2 | 7/2009 | Flores et al. | |
| 7,586,417 B2 | 9/2009 | Chisholm | |
| 7,705,482 B2 | 4/2010 | Leininger | |
| 7,705,733 B2 | 4/2010 | Tethrake et al. | |
| 7,740,425 B2 | 6/2010 | Zeiler et al. | |
| 7,755,482 B2 | 7/2010 | Hubbard | |
| 7,819,318 B2 | 10/2010 | White et al. | |

(Continued)

FOREIGN PATENT DOCUMENTS

| | | |
|---|---|---|
| DE | 102008013588 A1 | 9/2009 |
| EP | 2395457 A1 | 12/2011 |

(Continued)

*Primary Examiner* — Thien M Le
(74) *Attorney, Agent, or Firm* — Thomas|Hostemeyer, LLP

(57) ABSTRACT

Disclosed are various embodiments equipping a hand tool with an electronic identification device. The hand tool includes a handle having a cavity. A plug at least partially encapsulates the electronic device and inserts into the cavity in the handle. The plug may include one or more seals to prevent fluids or other debris from contacting the electronic identification device.

20 Claims, 5 Drawing Sheets

(56) References Cited

U.S. PATENT DOCUMENTS

| | | |
|---|---|---|
| 7,932,824 B2 | 4/2011 | Flores et al. |
| 8,020,768 B2 | 9/2011 | Ramos-Elizondo et al. |
| 8,035,518 B2 | 10/2011 | Kolton et al. |
| 8,040,221 B2 | 10/2011 | Murray et al. |
| 8,047,746 B2 | 11/2011 | Olsson et al. |
| 8,159,345 B2 | 4/2012 | Stevens |
| 8,193,938 B2 | 6/2012 | Halberthal et al. |
| 8,212,226 B2 | 7/2012 | Chisholm |
| 8,242,914 B2 | 8/2012 | Matityaho et al. |
| 2003/0102970 A1 | 6/2003 | Creel et al. |
| 2003/0105599 A1 | 6/2003 | Fisher et al. |
| 2004/0200980 A1 | 10/2004 | Blackwell |
| 2005/0110638 A1* | 5/2005 | Mohr ................ 340/572.1 |
| 2006/0085297 A1 | 4/2006 | Minerley |
| 2006/0214791 A1* | 9/2006 | Tethrake et al. ........ 340/572.1 |
| 2007/0124220 A1 | 5/2007 | Griggs et al. |
| 2007/0152046 A1 | 7/2007 | Hsieh |
| 2007/0244470 A1 | 10/2007 | Barker, Jr. et al. |
| 2007/0262867 A1 | 11/2007 | Westrick et al. |
| 2007/0278786 A1 | 12/2007 | Mezhinsky et al. |
| 2008/0115636 A1 | 5/2008 | DeRose et al. |
| 2008/0177267 A1 | 7/2008 | Sands et al. |
| 2008/0252446 A1 | 10/2008 | Dammertz |
| 2008/0262526 A1 | 10/2008 | Neubardt et al. |
| 2008/0303674 A1 | 12/2008 | Hara et al. |
| 2009/0175694 A1 | 7/2009 | Craig et al. |
| 2009/0201129 A1* | 8/2009 | Lane et al. ................ 340/10.1 |
| 2009/0283595 A1 | 11/2009 | White et al. |
| 2010/0000074 A1* | 1/2010 | Smith et al. ................ 29/594 |
| 2010/0096455 A1 | 4/2010 | Binmore |
| 2010/0176925 A1* | 7/2010 | Tethrake et al. ........... 340/10.1 |
| 2010/0252626 A1 | 10/2010 | Elizondo et al. |
| 2010/0277277 A1 | 11/2010 | Green et al. |
| 2010/0289626 A1 | 11/2010 | Oberle et al. |
| 2011/0025469 A1 | 2/2011 | Erdmann et al. |
| 2011/0057854 A1 | 3/2011 | Elbinger et al. |
| 2011/0109093 A1 | 5/2011 | Leininger |
| 2012/0007748 A1 | 1/2012 | Forgues et al. |
| 2012/0122575 A1* | 5/2012 | Barney et al. ................ 463/31 |
| 2012/0270657 A1* | 10/2012 | Barney et al. ................ 463/37 |

FOREIGN PATENT DOCUMENTS

| | | |
|---|---|---|
| GB | 2451957 A | 2/2009 |
| GB | 2465807 A | 6/2010 |
| JP | 2007183840 | 7/2007 |
| WO | 2006100283 A1 | 3/2006 |

\* cited by examiner

HAND TOOL HAVING AN ELECTRONIC IDENTIFICATION DEVICE

BACKGROUND

A Radio Frequency Identification (RFID) tag is a type of electronic identification device that may be used to identify and track various objects. In practice, an RFID tag is attached to an object, and an RFID reader senses the presence and identifying information associated with the RFID tag. The RFID reader may be located at an entrance or exit of an environment, thus facilitating the tracking and identifying of objects having RFID tags that enter or exit the environment.

RFID tags may be added to existing objects so that they may be tracked. To this end, an RFID tag may be mounted to the exterior of an object using adhesives or shrink wrap. However, by being mounted to the exterior of an object, the RFID tag may impede the intended functionality of the object. For example, if an RFID tag were mounted to the exterior of a hand tool, such as a screwdriver or nut driver, the hand tool may not be able to fit into tight spaces due to the increased size of the tool.

Additionally, hand tools may be used in industrial or mechanical environments, such as in a mechanic shop. As such, the hand tools are often dropped and may be exposed to other types of impacts during use. With an RFID tag mounted to the exterior of a hand tool, the RFID tag may bear the brunt of such impact, thereby increasing the likelihood of failure of the RFID tag.

Even further, hand tools are often used in environments where corrosive chemicals are present. If an RFID tag were mounted to the exterior of a hand tool, these chemicals are likely to make contact with the RFID tag and possibly cause failure of the RFID tag. Accordingly, there exists a need for an RFID-enabled hand tool that is protected from chemical exposure, able to withstand mechanical impact, and limits interference with the intended functionality of the hand tool.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure is direct towards a hand tool having an electronic identification device. As a non-limiting example, a handle of the hand tool includes a cavity configured to receive a plug. The plug at least partially encapsulates an RFID tag and is inserted into the cavity of the handle. The plug may provide a seal with respect to the cavity, thereby protecting the RFID tag from being exposed to corrosive chemicals. Additionally, by the RFID tag being in the interior of the plug and the handle, the RFID tag may be shielded or cushioned from impacts. Even further, by being placed in the interior of the handle, the RFID tag may not interfere with the intended functionality of the hand tool. In the following discussion, a general description of the system and its components is provided, followed by a discussion of the operation of the same.

Figure 1A:
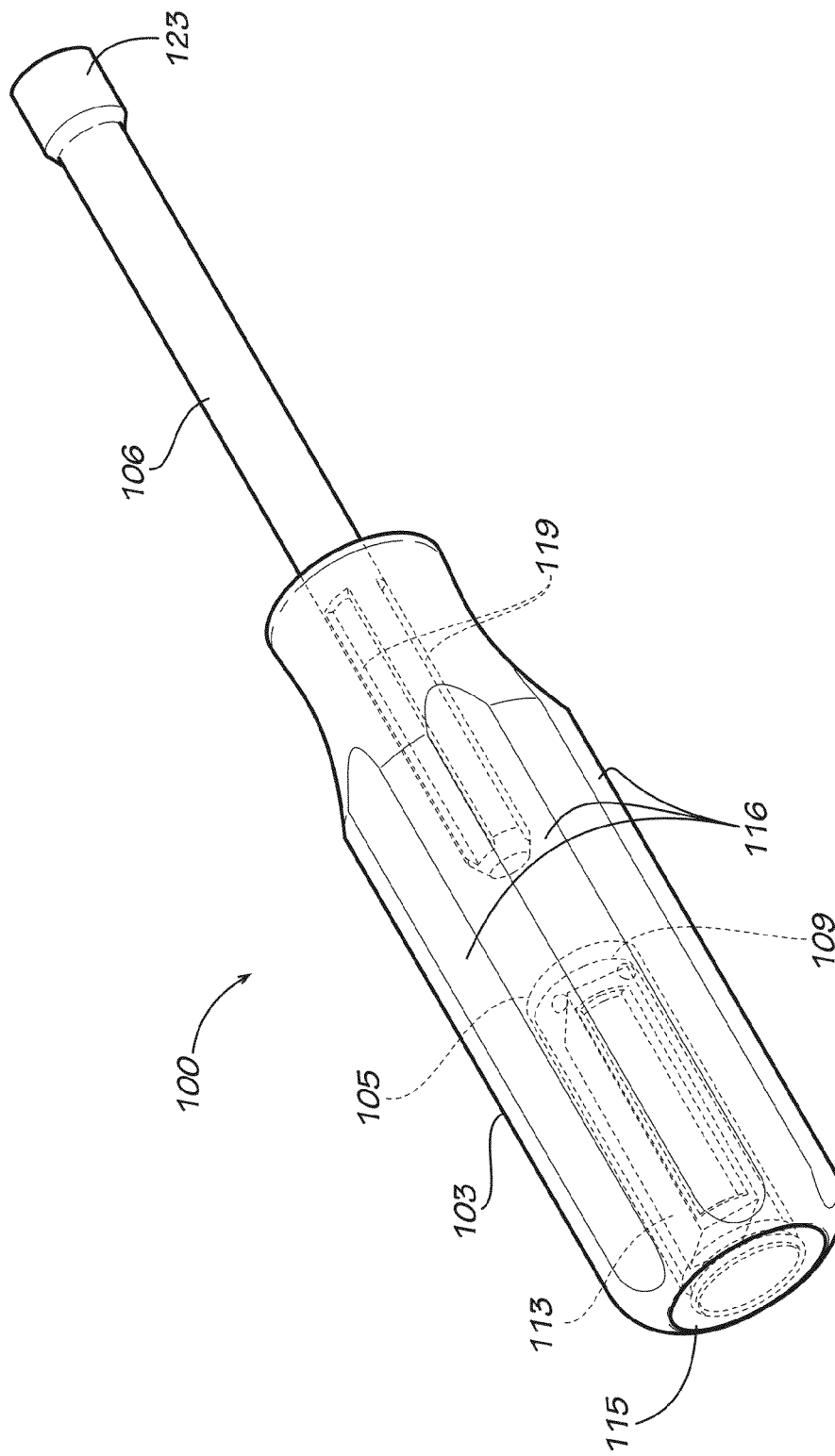
FIGS. 1A-1C are drawings of a hand tool according to various embodiments of the present disclosure.
Figure 1B:
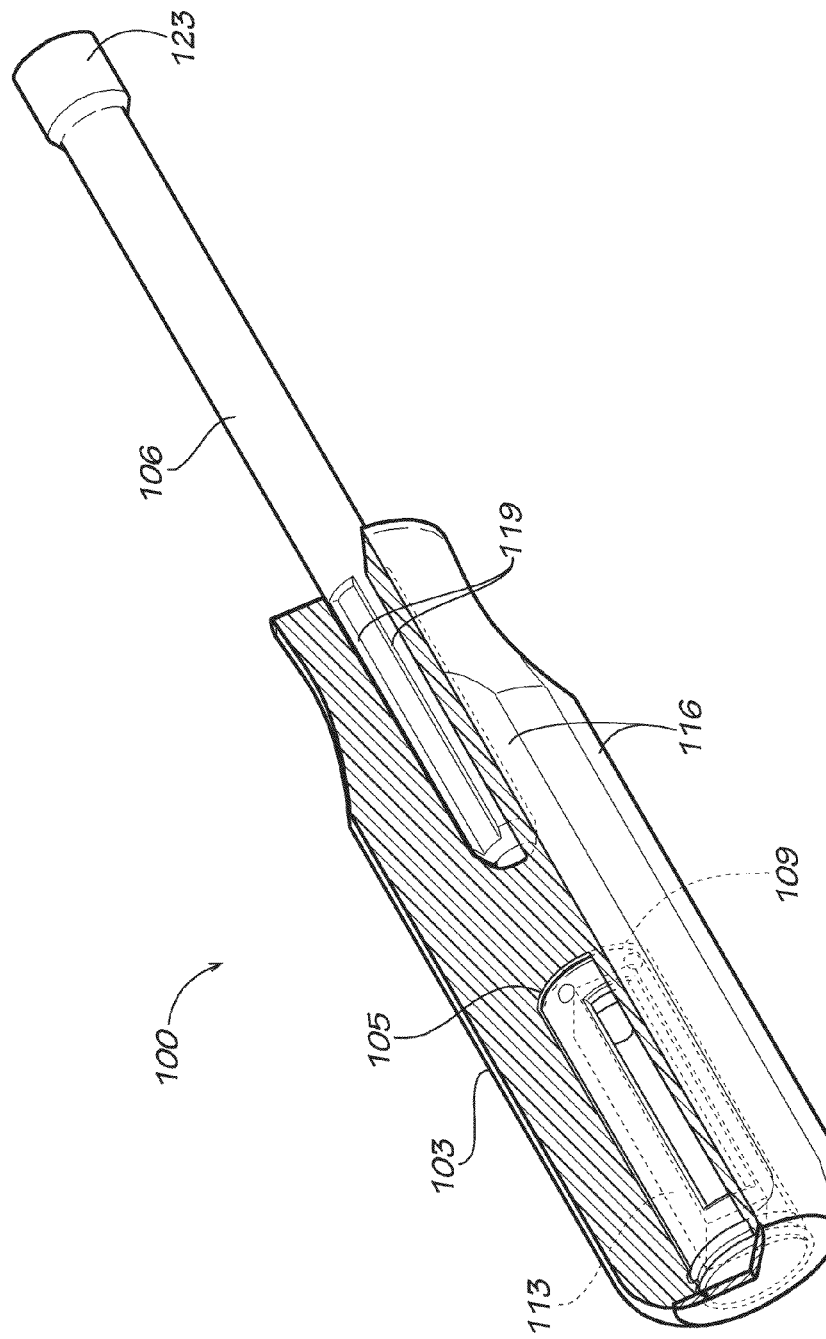
Figure 1C:
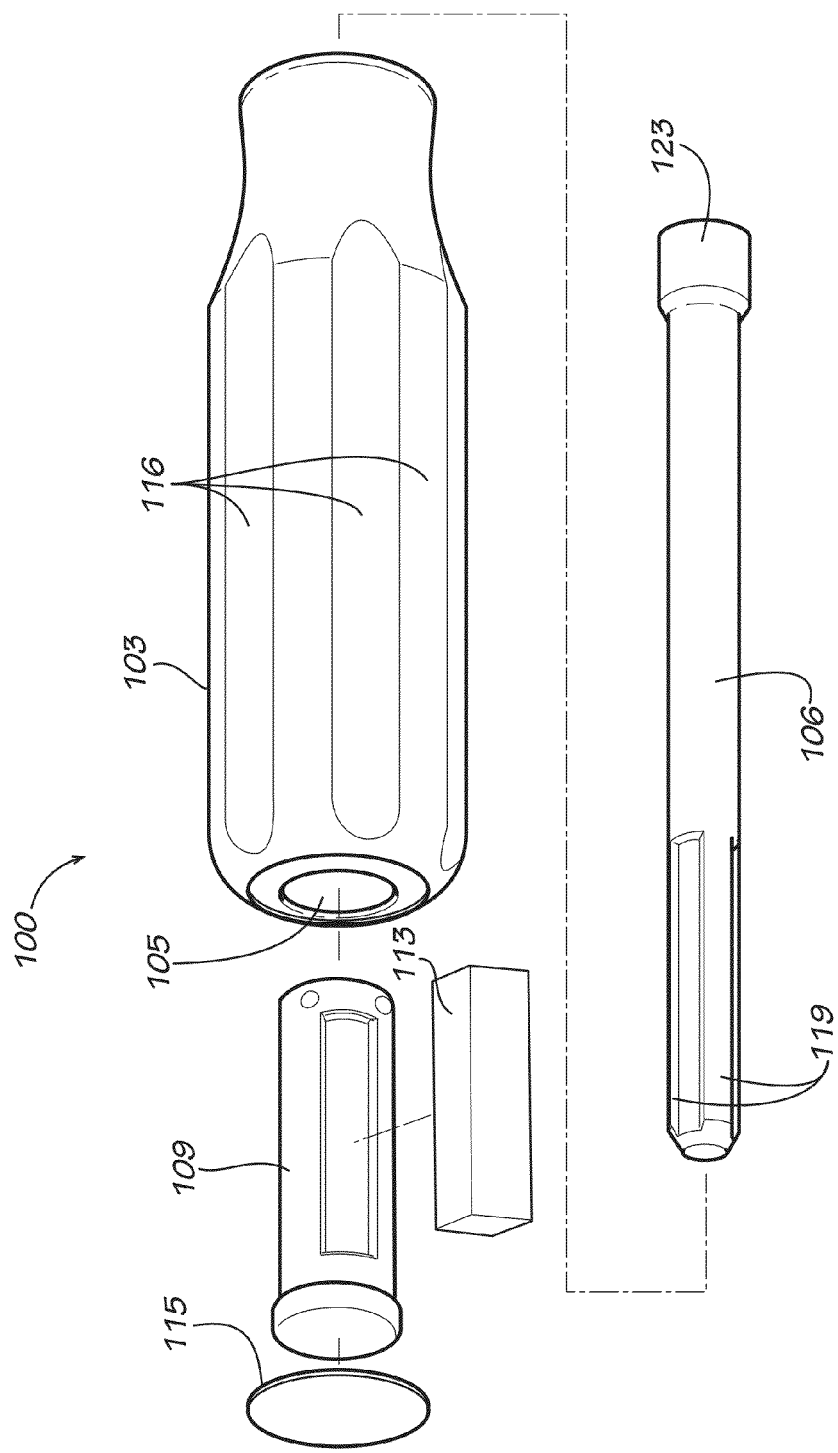
Figure 2A:
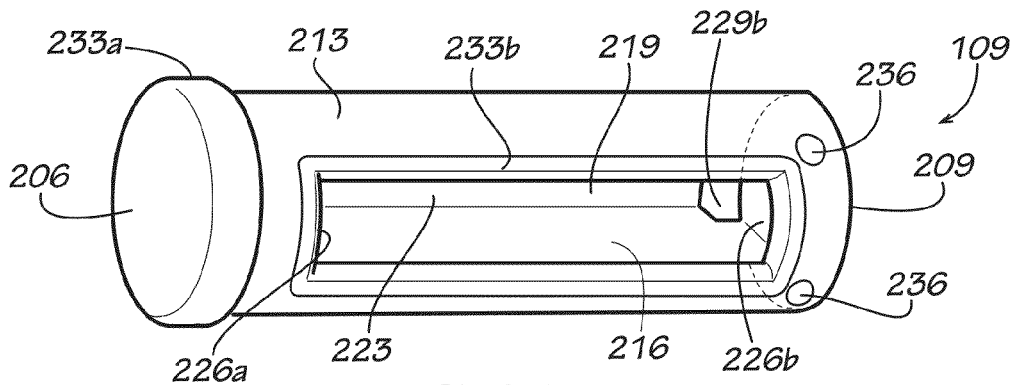
FIGS. 2A-2D are drawings of an plug of the hand tool of FIG. 1 according to various embodiments of the present disclosure.
Figure 2B:
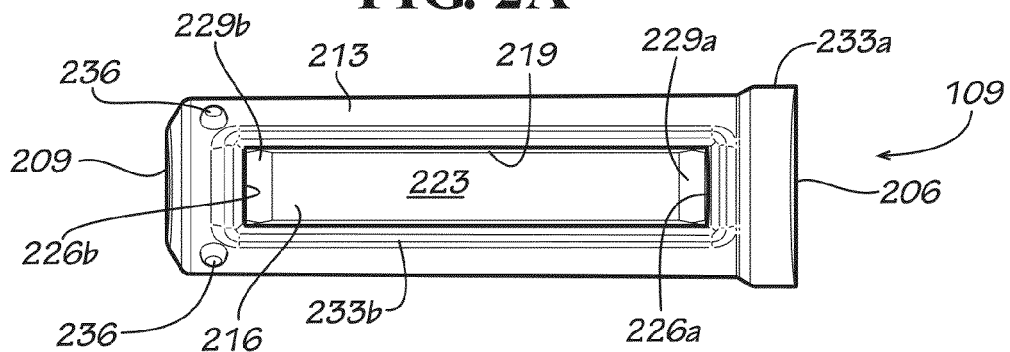
Figure 2C:
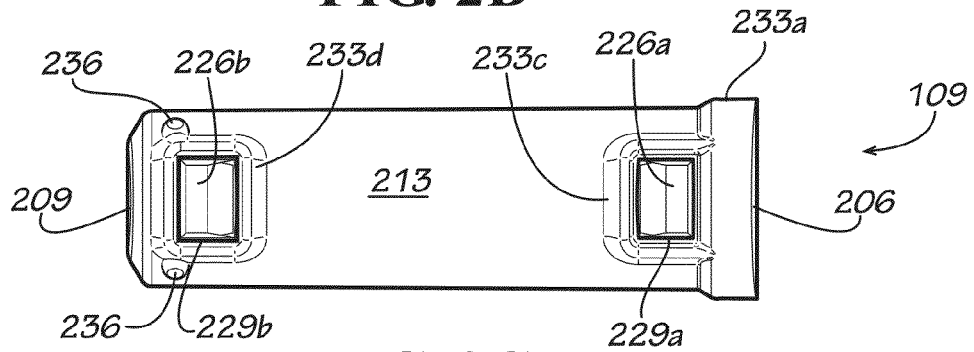
Figure 2D:
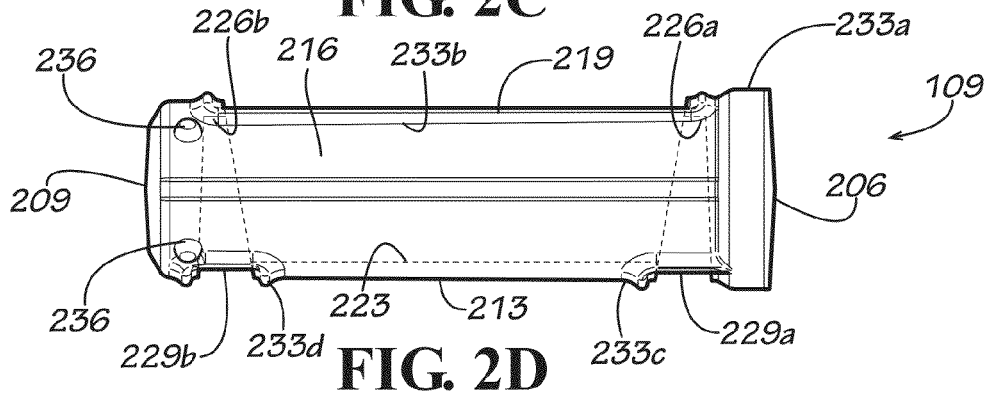

With reference to FIGS. 1A-1C, shown is a hand tool 100 according to various embodiments of the present disclosure. The hand tool 100 includes a handle 103, a shaft 106, a plug 109, an electronic identification device 113, a cap 115, and possibly other features not discussed in detail herein. The hand tool 100 shown is embodied in the form of a nutdriver. However, it is emphasized that in various embodiments, the hand tool 100 may be embodied in the form of, for example but not limited to, a screwdriver, a bit driver, a hammer, a mallet, a wrench, a cutting tool (e.g., scissors, a knife, etc.), a file, a scraper, a spatula, a chisel, a chisel holder, an awl, a punch, a brush, a broom, an axe, a pry bar, an extension mirror, an extension magnet, a level, or any other type of hand tool 100.

The handle 103 is a portion of the hand tool 100 that is configured to be gripped by a user, as may be appreciated. For example, in the case in which the hand tool 100 is a nutdriver, the handle 103 is the portion of the nutdriver that a user grips and rotates in order to tighten or loosen a fastener (not shown). The handle 103 may also include multiple grooves 116 or other features to facilitate a grip by a user. It is noted that the handle 103 may comprise a material that is transparent or semi-transparent to radio frequency energy, in order to facilitate the transmission of signals to or from the electronic identification device 113.

The handle 103 also includes a cavity 105. The cavity 105 may be configured to receive and at least partially encapsulate the plug 109. The cavity 105 may be formed in the handle 103 during manufacture of the handle 103, or a cavity 105 may be fabricated in a preexisting handle 103. The cavity 105 may be formed in a preexisting handle 103, for example, by drilling into the preexisting handle 103.

The shaft 106 is attached to and extends from the handle 103. To this end, a portion of the shaft 106 may be disposed in the handle 103. To secure the shaft 106 to the handle, and to prevent rotation of the shaft 106 with respect to the handle 103, the portion of the shaft 106 that is disposed in the handle 103 may include multiple outwardly extending fins 119.

At the opposite end of the shaft 106 may be a driver 123. The driver 123 may be configured to receive and rotate fasteners (such as but not limited to, screws, bolts, nuts, etc.), bits (e.g. Phillips bits, flathead bits, hex-head bits), or other items.

The electronic identification device 113 emits an identifying signal that is capable of being received by an appropriate reader (not shown). The identifying signal may include data that uniquely corresponds to the electronic identification device 113, thereby facilitating the identification of the hand tool 100 to which the electronic identification device 113 is attached. The electronic identification device 113 may be active, semi-active, or passive and may or may not include storage memory. In various embodiments, the electronic identification device 113 may be embodied in the form of an RFID tag or another type of electronic identification device 113 capable of emitting an identifying signal.

The plug 109 is configured to at least partially encapsulate the electronic identification device 113 and be inserted into the cavity 105 of the handle 103. In order to facilitate transmission of signals to and from the electronic identification device 113, the plug 109 may comprise a material that is transparent or semi-transparent to radio frequency energy. Additionally, the plug 109 may comprise a compressible material so as to facilitate a snug fit in the cavity 105. As such, the plug 109 may comprise an elastomeric material, for example.

Turning to FIGS. 2A-2D, shown is one embodiment, among others, of the plug 109. In the embodiment shown, the plug 109 is substantially cylindrical, but it is emphasized that other shapes of plugs 109 may be used as well. The plug 109 includes a first end 206, a second end 209, an exterior surface 213, a receptacle 216, and other features.

With the plug 109 inserted into the cavity 105 (FIGS. 1A-1C), the first end 206 may face away from the shaft 106, and the second end 209 may face towards the shaft 106 (FIGS. 1A-1C). The exterior surface 213 of the plug 109 extends between first end 206 and the second end 209. In various embodiments, the plug 109 may be tapered to facilitate insertion into and retention within the cavity 105. In this sense, the exterior surface 213 may taper (e.g., reduce in diameter) as it extends from the first end 206 to the second end 209.

The receptacle 216 receives and retains the electronic identification device 113 (FIGS. 1A-1C). To this end, the receptacle 216 may include an opening 219, an interior wall 223, one or more lips 226a-226b, one or more ports 229a-229b, and possibly other features. With the electronic identification device 113 inserted into the receptacle 216, an interior-facing side (not shown) of the electronic identification device 113 may abut the interior wall 223. Similarly, a portion of the exterior-facing side (not shown) of the electronic identification device 133 may abut the one or more lips 226a-226b. Thus, the lips 226a-226b may retain the electronic identification device 113 within the receptacle 216 and thus the plug 109.

The ports 229a-229b correspond to and may facilitate construction of the lips 226a-226b. For example, in the event that the plug 109 is manufactured using an injection molding process, the material from which the plug 109 is formed may be injected into a mold (not shown). Upon the material setting, one portion of the mold may form the lips 226a-226b and be removed through the ports 229a-229b, while another portion of the mold may form the interior wall 223 and be removed through the opening 219.

The plug 109 may also include one or more seals 233a-233d to prevent fluids or debris from entering the cavity 105 and/or the receptacle 216. The seal 233a is disposed around the exterior surface 213 near the first end 206 of the plug 109. The seal 233a may be formed as part of the plug 109, or the seal 233a may be embodied as an O-ring, for example. Upon the seal 233a being flush with the cavity 105, the seal 233a may prevent fluids or debris from entering the cavity 105 and thus the receptacle 216.

The seal 233b at least partially surrounds the opening 219 of the receptacle 216, and the seals 233c-233d at least partially surround the ports 229a-229b. With the plug 109 inserted into the cavity 105, the seals 233b-233d may become flush with the cavity 105 and thus prevent fluids or debris from entering the receptacle 216.

The plug 109 may further include one or more protrusions 236 that may be disposed towards the second end 209 of the plug 109 or on other areas of the exterior surface 213. The protrusions 236 may be configured to abut against the cavity 105 upon insertion. As such, the protrusions 236 may prevent the second end 209 from moving with respect to the cavity 105. Additionally, the protrusions 236 may provide cushioning for the electronic identification device 113 upon the hand tool 100 (FIGS. 1A-1C) being subjected to an impact.

Figure 3A:
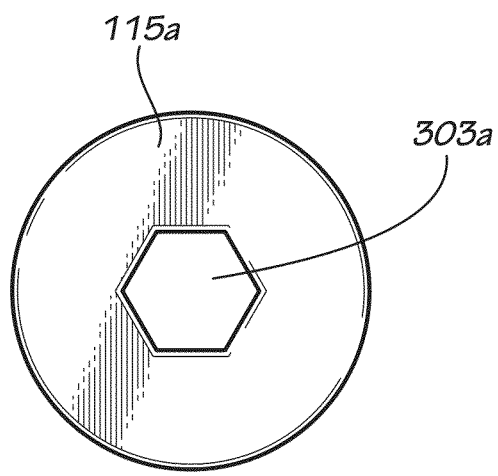
FIGS. 3A-3B are drawings of a cap of the hand tool of FIG. 1 according to various embodiments of the present disclosure.
Figure 3B:
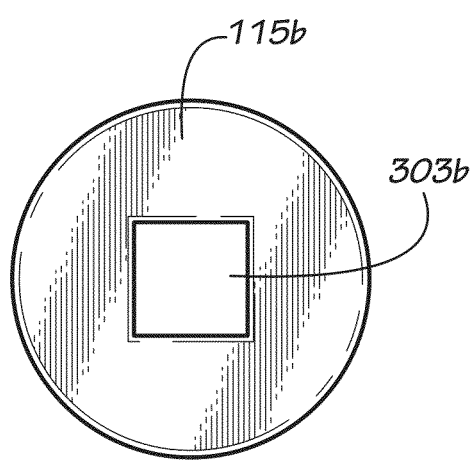

Turning now to FIGS. 3A-3B, shown are caps 115, referred to herein as caps 115a-115b, according to various embodiments. The caps 115a-115b may be attached to the handle 103 (FIGS. 1A-1C) and/or the first end 206 (FIGS. 2A-2D) of the plug 109. By being constructed separately from the plug 109, several different caps 115a-115b may be manufactured to fit a single style of the plug 109. Accordingly, manufacturing costs may be reduced.

The caps 115a-115b may include indicators 303a-303b, respectively, that indicate the type of hand tool 100 (FIGS. 1A-1C) to which a cap 115a-115b is attached. In various embodiments, the indicators 303a-303b may be embodied in the form of apertures. In this sense, the 303a-303b are "cutouts" from the caps 115a-115b. As non-limiting examples, the indicator 303a is an aperture that is in the shape of a hexagon, while the indicator 303b is an aperture that is in the shape of a square. In this example, the cap 115a may be attached to a hand tool 100 having a driver 123 (FIGS. 1A-1C) that fits a hex-head bolt, while the cap 115b may be attached to a hand tool 100 having a driver 123 that fits a square-head bolt.

Additionally, the plug 109 may have a color that differs from the color of the cap 115. Thus, with the hand tool 100 assembled, the color of the plug 109 may be visible through the indicator 303a-303b aperture of the cap 115a-115b. As a non-limiting example, if a red plug 109 and a black cap 115a having a hexagon indicator 303a were used, a red hexagon would be visible through the black cap 115a.

Next, a general description of the operation of the various components of the hand tool 100 is provided. To begin, it is assumed that the components have been assembled and that the shaft 106 is attached to the handle 103. As described above, the handle 103 may be manufactured so as to include the cavity 105. Otherwise, if a preexisting handle 103 lacks the cavity 105, the handle 103 may be retrofitted with the cavity 105, for example, by using a drill.

The electronic identification device 113 may be inserted into the receptacle 216 of the plug 109 so that the electronic identification device 113 is at least partially encapsulated within the plug 109. With the electronic identification device 113 being inserted into the receptacle 216, the lips 226a-226b may abut an outward facing side (not shown) of the electronic identification device 113. Thus, the lips 226a-226b may facilitate retaining the electronic identification device 113 within the plug 109.

With the electronic identification device 113 at least partially encapsulated within the plug 109, the plug 109 and the electronic identification device 113 may be inserted into the cavity 105 of the handle 103. The seals 233a-233d may then become flush against the cavity 105, thereby preventing fluids and debris from making contact with the electronic identification device 113. Additionally, a sealant or adhesive may be applied to the cavity 105 and/or plug 109 to prevent penetration by fluids and debris and to further retain the plug 109 within the cavity 105. Thereafter, the cap 115 may be applied to the first end 206 of the plug 109 and/or the handle 103 by using an adhesive, mechanical attachment (e.g., threads), or other methods.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, at least the following is claimed:

1. An apparatus, comprising:
   a tool handle comprising a cavity;

a plug located in the cavity of the tool handle, the plug comprising:
  a first end and a second end;
  an exterior surface extending from the first end to the second end;
  a receptacle extending from an opening at the exterior surface to an interior wall of the plug, the receptacle comprising a plurality of lips at the opening of the receptacle;
  a plurality of ports that facilitate formation of the lips using an injection molding process;
  a first seal located on the exterior surface proximate to the first end;
  a second seal located on the exterior surface, the second seal at least partially surrounding the opening of the receptacle; and
  a plurality of third seals located on the exterior surface, each one of the third seals at least partially surrounding a respective one of the ports; and
a radio frequency identification tag at least partially encapsulated within the plug.

2. The apparatus of claim 1, further comprising a cap covering the first end of the plug, the cap comprising an aperture.

3. The apparatus of claim 1, wherein the plug further comprises a plurality of protrusions extending from the exterior surface.

4. The apparatus of claim 1, further comprising a shaft extending from the tool handle, the shaft comprising a driver configured to receive a fastener.

5. An apparatus, comprising:
  an electronic identification device; and
  a plug configured to at least partially encapsulate the electronic identification device and to insert into a cavity of a handle of a driver tool, wherein the driver tool is configured to drive a fastener, wherein the plug provides a seal that prevents a chemical from entering the cavity.

6. The apparatus of claim 5, wherein a plug end of the plug is configured to be flush with an end of the handle of the driver tool.

7. The apparatus of claim 5, wherein the plug further comprises a receptacle configured to receive the electronic identification device, the receptacle extending from an opening at an exterior surface of the plug towards an interior wall in the plug.

8. The apparatus of claim 7, wherein the plug further comprises a second seal disposed at least partially around the receptacle.

9. The apparatus of claim 7, wherein the plug further comprises a lip at the opening of the receptacle.

10. The apparatus of claim 9, wherein the plug further comprises a port extending from the exterior surface to the lip.

11. The apparatus of claim 5, wherein the plug is tapered.

12. The apparatus of claim 11, wherein the plug further comprises a plurality of protrusions extending from an exterior surface of the plug.

13. The apparatus of claim 5, wherein the plug further comprises an elastomeric material.

14. The apparatus of claim 5, further comprising a cap configured to cover an end of the plug.

15. The apparatus of claim 14, wherein the cap further comprises an indicator indicating a type of fastener driver.

16. The apparatus of claim 15, wherein the indicator is embodied as an aperture.

17. A method, comprising:
  inserting an electronic identification device into a plug configured to at least partially encapsulate the electronic identification device;
  inserting the plug into a cavity in a handle of a driver tool, the driver tool comprising a driver shaft that is attached to and extends from the handle; and
  rotating the driver shaft to thereby drive a fastener.

18. The method of claim 17, wherein the plug prevents a chemical from entering the cavity.

19. The method of claim 17, further comprising the step of covering an end of the plug with a cap.

20. The method of claim 17, wherein the driver tool is a screwdriver or a nut driver.

* * * * *